US011472544B2

(12) United States Patent
Heironimus et al.

(10) Patent No.: US 11,472,544 B2
(45) Date of Patent: Oct. 18, 2022

(54) ELECTRIC DRIVE SYSTEM LINE REPLACEABLE UNIT WITH INTEGRATED COLLECTIVE ACTUATION

(71) Applicant: Bell Textron Inc., Fort Worth, TX (US)

(72) Inventors: William Kyle Heironimus, Dallas, TX (US); Stephen Yibum Chung, Keller, TX (US)

(73) Assignee: Textron Innovations Inc., Providence, RI (US)

(*) Notice: Subject to any disclaimer, the term of this patent is extended or adjusted under 35 U.S.C. 154(b) by 289 days.

(21) Appl. No.: 16/808,836

(22) Filed: Mar. 4, 2020

(65) Prior Publication Data

US 2021/0276706 A1 Sep. 9, 2021

(51) Int. Cl.

| | |
|---|---|
| ***B64C 27/68*** | (2006.01) |
| ***B64C 29/00*** | (2006.01) |
| ***B64D 27/24*** | (2006.01) |
| ***B64D 33/08*** | (2006.01) |
| ***H02K 9/06*** | (2006.01) |
| ***H02K 5/22*** | (2006.01) |
| ***H02K 7/108*** | (2006.01) |
| ***H02K 7/116*** | (2006.01) |
| ***H02K 9/193*** | (2006.01) |

(52) U.S. Cl.

CPC .......... *B64C 27/68* (2013.01); *B64C 29/0033* (2013.01); *B64D 27/24* (2013.01); *B64D 33/08* (2013.01); *H02K 5/225* (2013.01); *H02K 7/108* (2013.01); *H02K 7/116* (2013.01); *H02K 9/06* (2013.01); *H02K 9/193* (2013.01); *H02K 2213/06* (2013.01)

(58) Field of Classification Search

CPC ..... B64C 27/68; B64C 29/0033; B64D 27/24; B64D 33/08

USPC ........................................................ 244/158.1

See application file for complete search history.

(56) References Cited

U.S. PATENT DOCUMENTS

| | | |
|---|---|---|
| 3,797,783 A | 3/1974 | Kisovec |
| 8,469,306 B2 | 6/2013 | Kuhn, Jr. |

(Continued)

FOREIGN PATENT DOCUMENTS

| | | |
|---|---|---|
| DE | 102015226836 A1 | 7/2017 |
| EP | 3171496 A1 | 5/2017 |

(Continued)

OTHER PUBLICATIONS

EPO Examination Report issued in EP Application 21173897.6 dated Nov. 15, 2021, 8 pages.

(Continued)

*Primary Examiner* — Brady W Frazier

(74) *Attorney, Agent, or Firm* — Akona IP PC

(57) ABSTRACT

One embodiment is an electric drive system for an aircraft comprising a plurality of redundant motors, wherein power generated by the plurality of motors is used to drive a rotor system comprising a rotor shaft having a plurality of rotor blades connected thereto; a gear box associated with the plurality of redundant motors; a collective actuator for controlling a collective pitch of the rotor blades connected to the rotor shaft; and at least one structural element for retaining the redundant motors, the gear box, and the collective actuator together as a single integrated unit.

20 Claims, 12 Drawing Sheets

(56) References Cited

U.S. PATENT DOCUMENTS

| | | | | |
|---|---|---|---|---|
| 9,156,545 | B1 | 10/2015 | Fenny et al. | |
| 9,823,022 | B2 | 11/2017 | Rollins et al. | |
| 2002/0079763 | A1 | 6/2002 | Fleshman et al. | |
| 2006/0037743 | A1 | 2/2006 | Head | |
| 2007/0273225 | A1 | 11/2007 | Head | |
| 2011/0024555 | A1 | 2/2011 | Kuhn, Jr. | |
| 2011/0084561 | A1 | 4/2011 | Swales et al. | |
| 2012/0282103 | A1* | 11/2012 | Muren | B64C 27/68 416/205 |
| 2014/0151495 | A1 | 6/2014 | Kuhn, Jr. | |
| 2014/0299708 | A1 | 10/2014 | Green et al. | |
| 2016/0099628 | A1 | 4/2016 | Ried et al. | |
| 2017/0190435 | A1 | 7/2017 | Kobayashi et al. | |
| 2017/0217600 | A1 | 8/2017 | Regev | |
| 2018/0050811 | A1 | 2/2018 | Niergarth et al. | |
| 2018/0057157 | A1 | 3/2018 | Groninga et al. | |
| 2018/0251226 | A1 | 9/2018 | Fenny et al. | |
| 2018/0257761 | A1 | 9/2018 | Oldroyd et al. | |
| 2018/0362160 | A1 | 12/2018 | Groninga et al. | |
| 2019/0031336 | A1 | 1/2019 | McCullough et al. | |
| 2019/0135427 | A1 | 5/2019 | Robertson et al. | |
| 2019/0144126 | A1 | 5/2019 | Groninga et al. | |
| 2019/0193835 | A1* | 6/2019 | Sandberg | B64C 11/34 |
| 2019/0270516 | A1 | 9/2019 | Sinusas et al. | |
| 2019/0288571 | A1 | 9/2019 | Lehikoinen et al. | |
| 2019/0301537 | A1 | 10/2019 | Olson | |
| 2019/0329859 | A1* | 10/2019 | Bevirt | B64D 27/24 |
| 2019/0389570 | A1 | 12/2019 | Lauder | |
| 2020/0028389 | A1 | 1/2020 | Long et al. | |
| 2021/0039796 | A1* | 2/2021 | Hirabayashi | B64D 35/08 |

FOREIGN PATENT DOCUMENTS

| | | | |
|---|---|---|---|
| EP | 2353684 | B1 | 10/2017 |
| EP | 3486170 | A1 | 5/2019 |
| EP | 3738887 | A1 | 11/2020 |
| WO | 2016020915 | A1 | 2/2016 |
| WO | 2018045253 | A1 | 3/2018 |
| WO | 2019040490 | A1 | 2/2019 |
| WO | 2019079688 | A1 | 4/2019 |

OTHER PUBLICATIONS

EPO Search Report issued in EP Application 21173899.2 dated Nov. 5, 2021, 4 pages.

USPTO Non-Final Office Action for U.S. Appl. No. 16/808,818 dated Jan. 12, 2022.

EPO Search Report issued in EP Application 21156415.8 dated Aug. 5, 2021, 4 pages.

EPO Examination Report issued in EP Application 21156416.6 dated Jul. 21, 2021, 5 pages.

EPO Examination Report issued in EP Application 21156417.4 dated Jul. 23, 2021, 6 pages.

EPO Search Report issued in EP Application 21156416.6 dated Jul. 9, 2021, 4 pages.

EPO Search Report issued in EP Application 21156417.4 dated Jul. 12, 2021, 4 pages.

EPO Examination Report issued in EP Application 21156415.8 dated Aug. 18, 2021, 8 pages.

EPO Search Report issued in EP Application 21173897.6 dated Nov. 3, 2021, 4 pages.

EPO Examination Report issued in EP Application 21173899.2 dated Dec. 1, 2021, 8 pages.

EPO Search Report issued in EP Application 21207937.0 dated Apr. 14, 2022, 4 pages.

USPTO Non-Final Office Action for U.S. Appl. No. 16/912,345 dated Apr. 13, 2022.

EPO Examination Report issued in EP Application 21207937.0 dated Apr. 2021, 8 pages.

USPTO Non-Final Office Action for U.S. Appl. No. 16/808,851 dated May 18, 2022.

* cited by examiner

ELECTRIC DRIVE SYSTEM LINE REPLACEABLE UNIT WITH INTEGRATED COLLECTIVE ACTUATION

TECHNICAL FIELD

This disclosure relates in general to the field of aircraft and, more particularly, though not exclusively, to an electric drive system with integrated collective actuation implemented as a line replaceable unit ("LRU") for such aircraft.

BACKGROUND

An electric motor may be used by aircraft as a power source for various functions, such as supplying rotational energy in an aircraft propulsion system. Some electric motors cool their internal electrical components using airflow, drawing ambient air into the motor and exhausting the warmed air out of the motor. In aircraft propulsion systems that utilize only a single motor, the lack of a backup motor increases the likelihood of a crash or other catastrophic condition should the motor fail. A single motor propulsion system also may not meet the power demands required by the propulsion system in the most efficient manner. Using two or more motors in a propulsion system addresses these concerns, but can give rise to other issues, including, but not limited to, an air management problem.

SUMMARY

One embodiment is an electric drive system comprising a plurality of redundant motors, wherein power generated by the plurality of motors is used to drive a rotor system comprising a rotor shaft having a plurality of rotor blades connected thereto; a gear box associated with the plurality of redundant motors; a collective actuator for controlling a collective pitch of the rotor blades connected to the rotor shaft; and at least one structural element for retaining the redundant motors, the gear box, and the collective actuator together as a line replaceable unit.

The electric drive system may further include a cooling fan for drawing air into the line replaceable unit across an electronic component of the line replaceable unit to cool the electronic component and for expelling air into an oil cooler for cooling oil contained therein. In certain embodiments, the cooling fan is mechanically powered by the rotor shaft. In other embodiments, the cooling fan is electrically powered. The electric drive system may further include an oil distribution system for distributing oil cooled by the oil cooler to at least one motor and at least one gearbox, wherein the distributed oil is used to cool the at least one motor and the at least one gearbox. The electric drive system may still further include a reservoir for collecting the distributed oil after it has been used to cool the at least one motor and the at least one gearbox.

In some embodiments, the electric drive system may include a pump associated with the reservoir for returning the oil collected in the reservoir to the oil cooler. In particular embodiments, the at least one structural element may include a housing having electrical connectors therethrough, while in other embodiments, the at least one structural element comprises first and second rails disposed on opposite sides of the unit. Each of the motors may be an electric motor and the rotor shaft may be disposed through a center of the integrated unit. Additionally, each of the motors may have associated therewith a one-way clutch.

Another embodiment is a rotor system comprising a ducted rotor comprising a plurality of rotor blades connected to a rotor shaft; a nacelle for supporting the ducted rotor; and an electric drive system. The electric drive system includes a plurality of redundant motors; a gear box associated with the plurality of redundant motors; a collective actuator for controlling a collective pitch of the rotor blades connected to the rotor shaft; and at least one structural element for retaining the redundant motors, the gear box, and the collective actuator together as a single integrated unit. Power generated by the plurality of motors is used to drive the rotor shaft and wherein the electric drive system is implemented as a line replaceable unit disposed in the nacelle.

The at least one structural element may be one of a housing and first and second rails disposed on opposite sides of the unit. Each of the motors may be an electric motor having associated therewith a one-way clutch. In certain embodiments, the rotor shaft is disposed through a center of the line replaceable unit.

Yet another embodiment is a rotorcraft comprising a rotor system comprising a ducted rotor comprising a plurality of rotor blades connected to a rotor shaft; a nacelle for supporting the ducted rotor; and an electric drive system. The electric drive system may include a plurality of redundant motors; a gear box associated with the plurality of redundant motors; a collective actuator for controlling a collective pitch of the rotor blades connected to the rotor shaft; and at least one structural element for retaining the redundant motors, the gear box, and the collective actuator together as a single integrated unit. Power generated by the plurality of motors may be used to drive the rotor shaft and the electric drive system may be implemented as a line replaceable unit disposed in the nacelle.

The at least one structural element may comprise at least one of a housing and first and second rails disposed on opposite sides of the unit and each of the motors may be an electric motor having associated therewith a one-way clutch. In certain embodiments, the rotor shaft may be disposed through a center of the line replaceable unit.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1A:
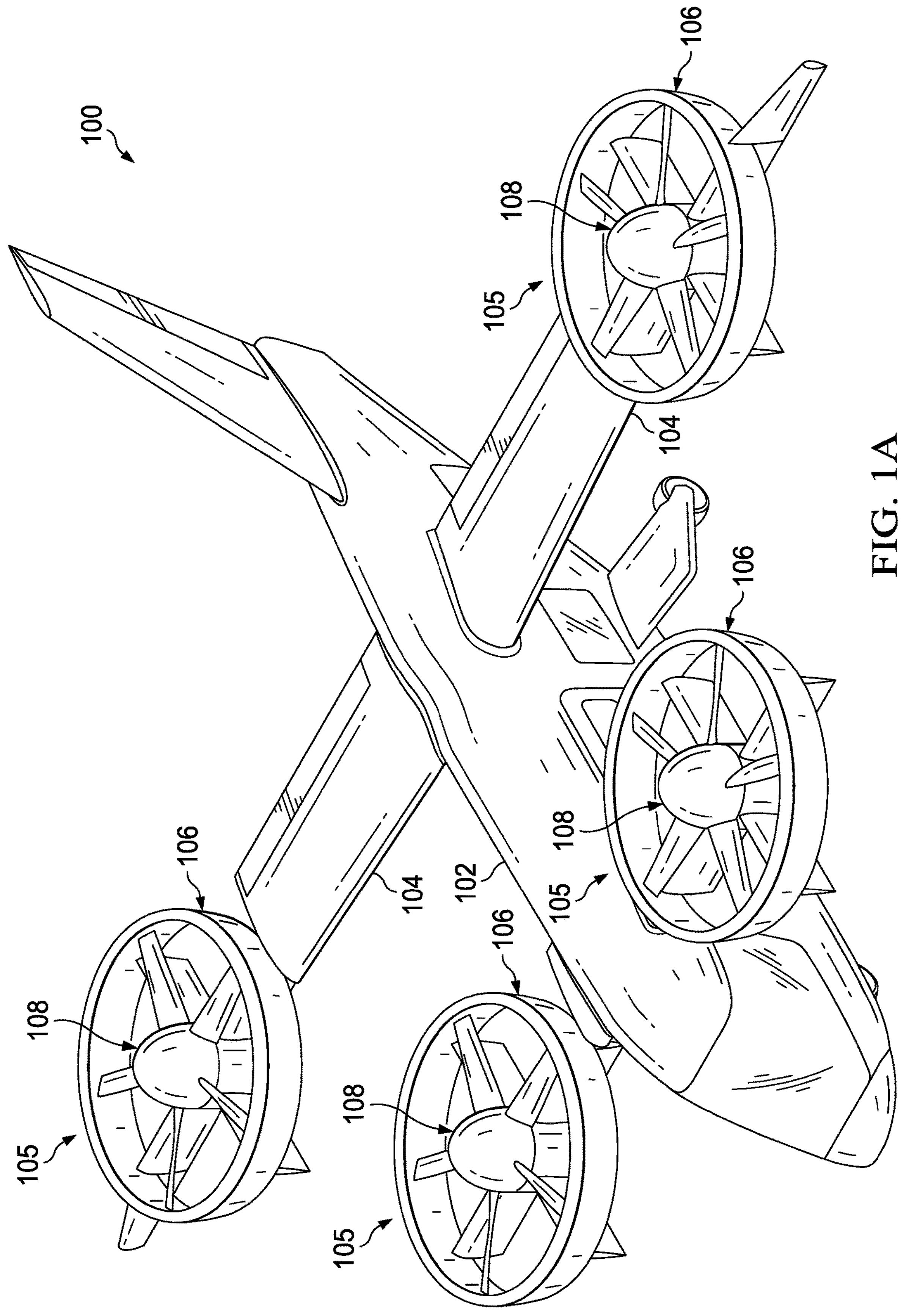
FIGS. 1A-1B illustrate a tilting ducted rotor aircraft including an electric drive system line replaceable unit in accordance with embodiments described herein.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this Specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect (s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Described herein is a power unit assembly comprising an electrical drive system line replaceable unit including multiple electrical motors combined via a gear box. The motors power a rotor shaft through the gearbox. In certain embodiments, motor cooling is handled via a liquid reservoir/pump assembly, an air-to-liquid heat exchanger, and an air cooling fan. Fluid may be cycled through the motors and the heat exchanger. The cooling fan may be powered either electrically or mechanically (e.g., via the rotor shaft). A collective pitch control rod and actuator may also be integral to the assembly, but is optional. Embodiments of the disclosure allow for the entire power unit to be easily replaced, since the supporting systems (thermal cooling, fixed controls, transmission) are integral to the assembly. The only interfaces to the aircraft are the electrical connectors, the structural attachments to the airframe, and the rotor bolt pattern. The integration allows for expedited aircraft maintenance and lower aircraft direct operating cost.

Figure 1B:
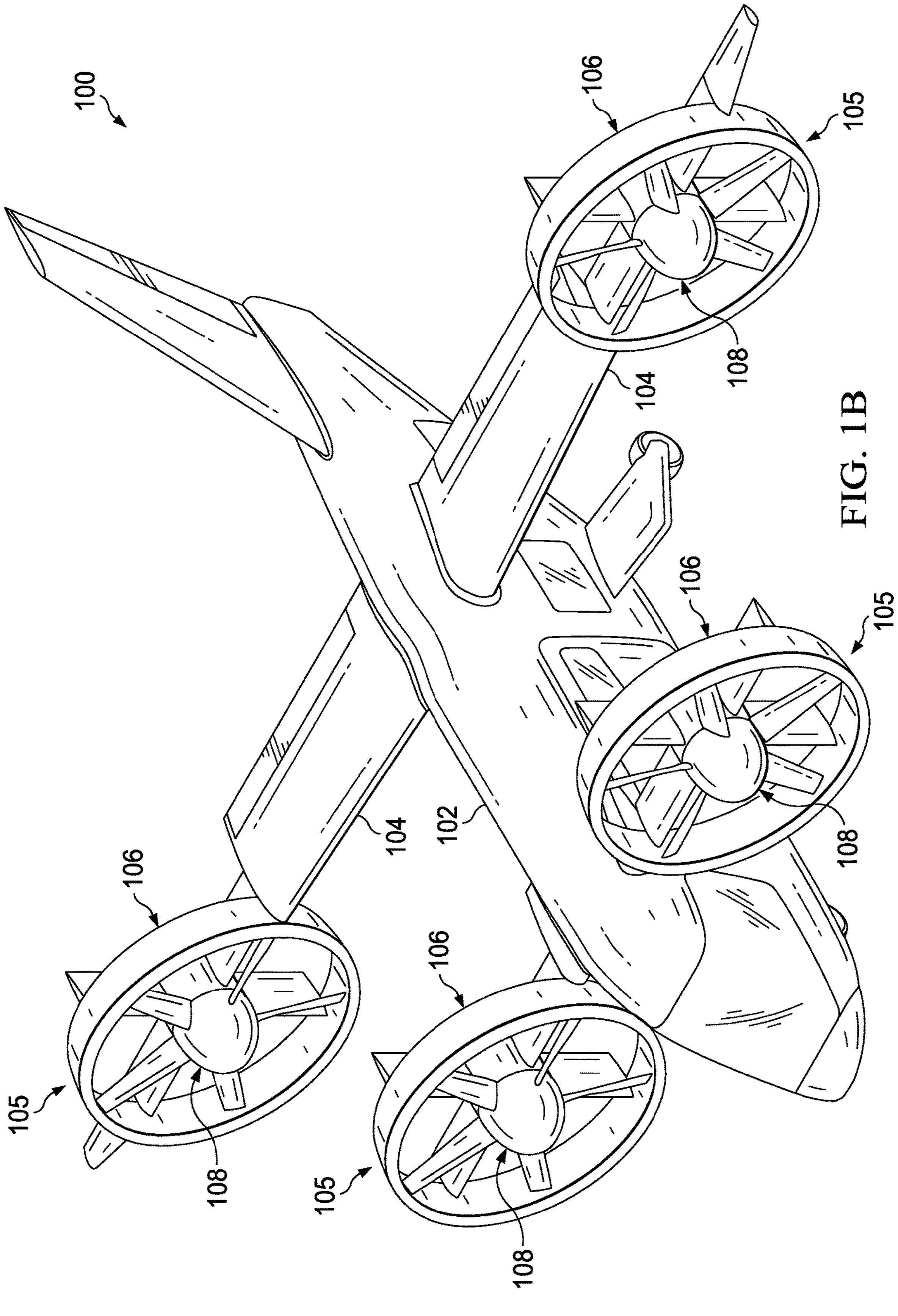
Figure 2:
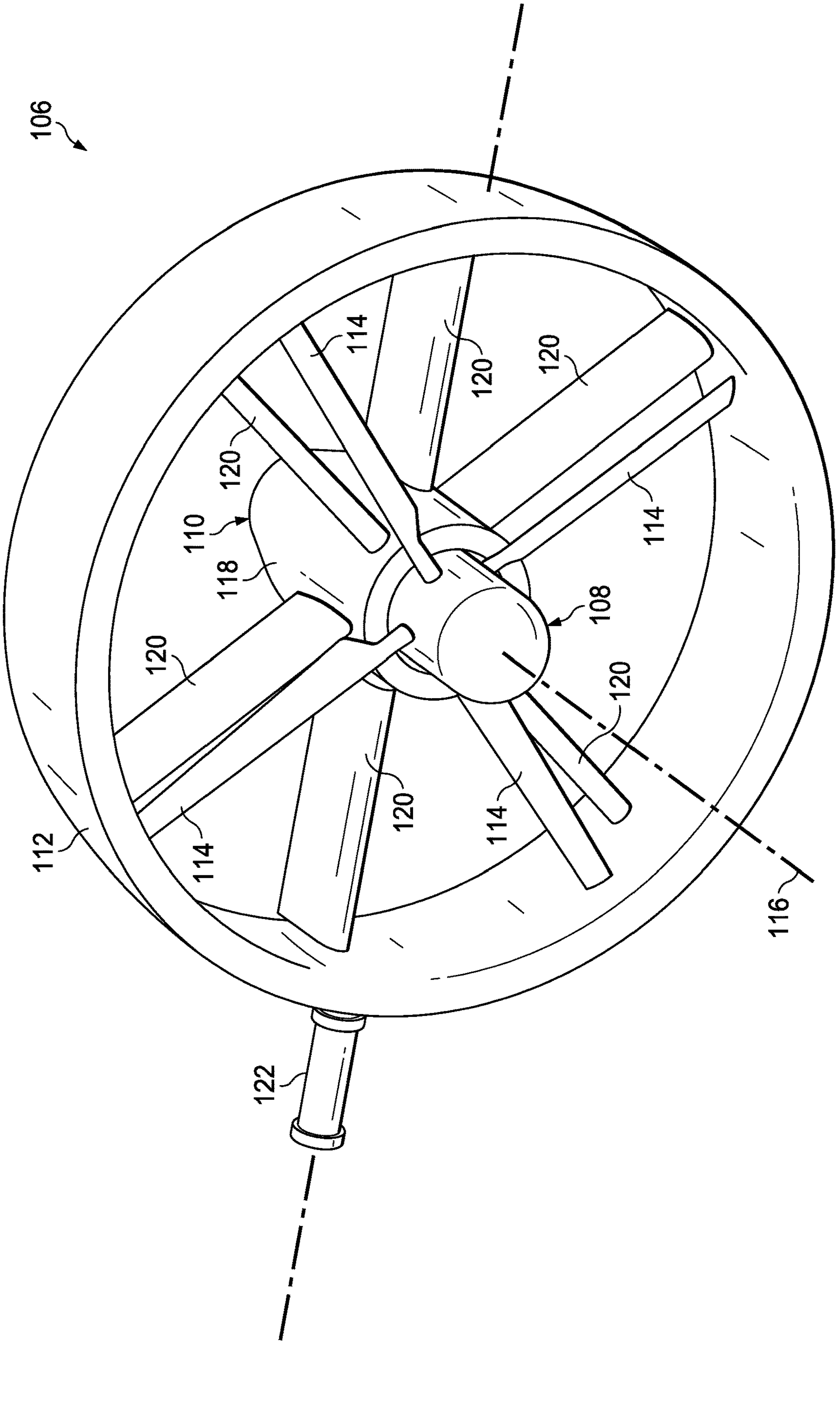
FIG. 2 illustrates a ducted rotor of the aircraft of FIGS. 1A-1B in accordance with embodiments described herein.

FIGS. 1A and 1B illustrate an example tiltrotor aircraft 100 that includes ducted rotors (or fans). The tiltrotor aircraft 100 is convertible between a helicopter mode (shown in FIG. 1A), which allows for vertical takeoff and landing, hovering, and low speed directional movement, and an airplane mode (shown in FIG. 1B), which allows for forward flight as well as horizontal takeoff and landing. Aircraft 100 includes a fuselage 102, wings 104, and a plurality propulsion assemblies 105 each comprising a ducted fan 106 rotatably coupled to fuselage 102 or wings 104. As best shown in FIG. 2, each ducted fan 106 includes a rotor assembly 108, a flow-straightening stator assembly 110, and a duct 112 surrounding rotor assembly 108 and stator assembly 110. Rotor assembly 108 includes a plurality of rotor blades 114 configured to rotate about a mast axis 116. Rotation of rotor blades 114 about mast axis 116 generates lift while operating in helicopter mode and thrust while operating in airplane mode. Stator assembly 110 is positioned downstream of rotor blades 114 and includes a stator hub 118 centrally located within duct 112 and a plurality of stator vanes 120 coupled between duct 112 and stator hub 118. Stator hub 118 may house an electric motor therein configured to produce rotational energy that drives the rotation of rotor assembly 108. Alternatively, stator hub 118 may house a gearbox therein that drives the rotation of rotor assembly 108, wherein the gearbox receives rotational energy from a driveshaft passing through an attachment post 122 and the adjacent stator vane 120.

Rotor blade assemblies 108 can be collectively manipulated to selectively control direction, thrust and lift of tilting ducted fan aircraft 100. Indeed, the collective pitch of rotor blade assemblies 108 may be independently controlled from one another to allow for differential thrust output by ducted fans 106. For example, the collective pitch of the rotor blade assembly of one ducted fan may be higher or lower than the collective pitch of rotor blade assembly of another ducted fan such that the thrust generated by each ducted fan differs from each of the others.

Ducted fans 106 are each convertible, relative to fuselage 102, between a horizontal position, as shown in FIG. 1A, and a vertical position, as shown in FIG. 1B. Ducted fans 106 are in the horizontal position during vertical takeoff and landing mode. Vertical takeoff and landing mode may be considered to include hover operations of tilting ducted fan aircraft 100. Ducted fans 106 are in the vertical position during forward flight mode, in which tilting ducted fan aircraft 100 is in forward flight. In forward flight mode, ducted fans 106 direct their respective thrusts in the aft direction to propel tilting ducted fan aircraft 10 forward. Tilting ducted fan aircraft 100 is operable to fly in all directions during the vertical takeoff and landing mode configuration of FIG. 1A, although faster forward flight is achievable while in the forward flight mode configuration of FIG. 1B. Ducted fans 106 may be tiltable between the vertical and horizontal positions by a rotatable shafts (not shown) extending through wings 104 and which are rotatable in response to commands originating from a pilot and/or a flight control system.

Figure 3:
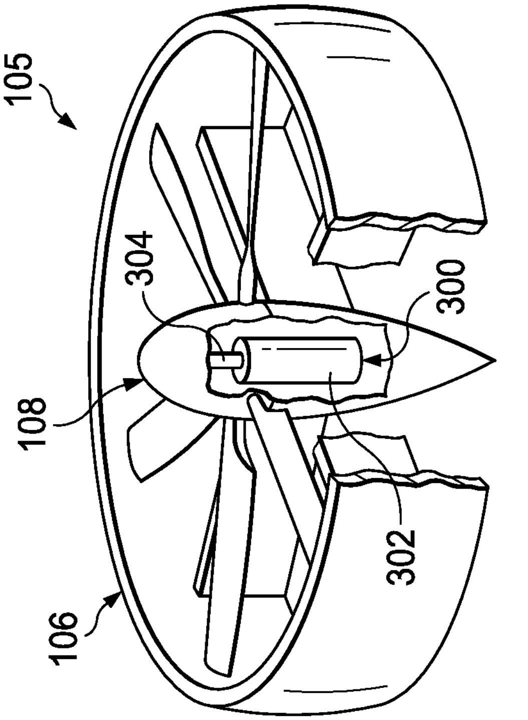
FIG. 3 is a close-up cutaway view of a portion of the ducted rotor of FIG. 2 in accordance with embodiments described herein.

As shown in FIG. 3, and as will be described in detail below, each of the propulsion assemblies 105 utilize an electric motor assembly 300 disposed within a respective rotatable pylon 302 as a power source to rotate the respective rotor hub assembly 108 via a rotor mast 304. As will be described in greater detail below with reference to the remaining figures, the electric motor assembly 300 is implemented as a line replaceable unit ("LRU")

Figure 4A:
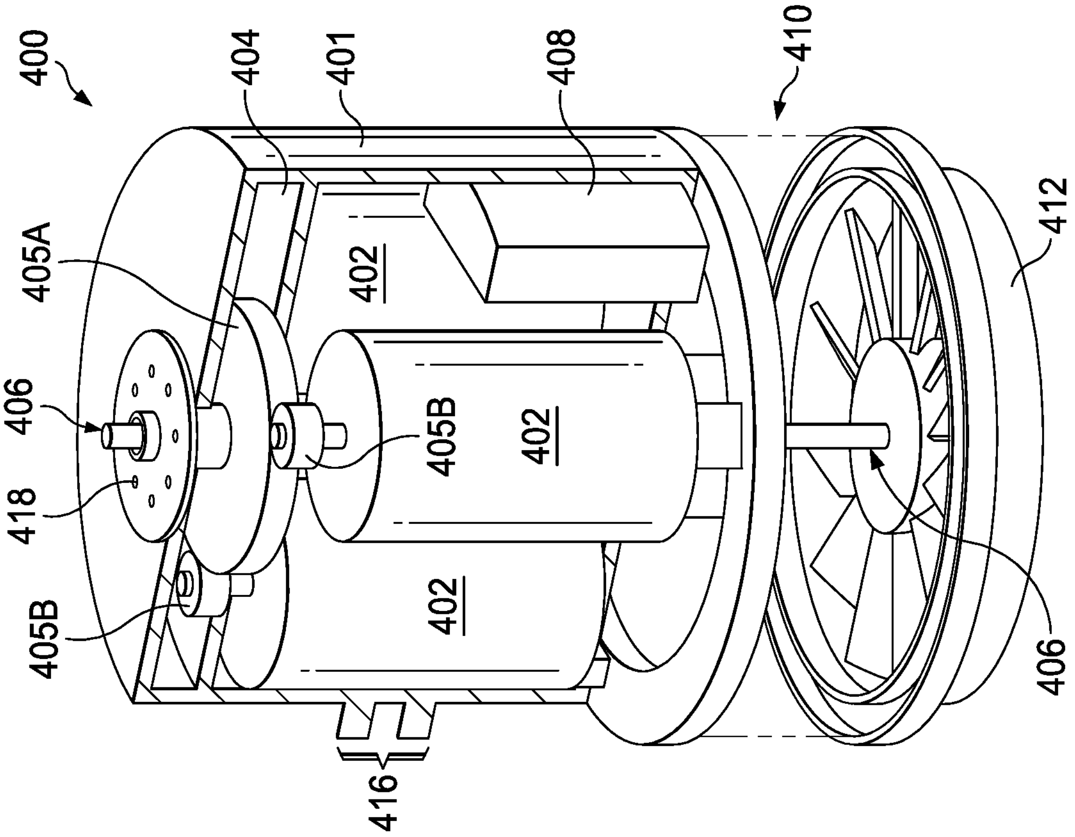
FIGS. 4A-4C illustrate an example embodiment of an electric drive system line replaceable unit in accordance with one embodiment for implementation in an aircraft having ducted rotors, such as that illustrated in FIGS. 1A-1B.
Figure 4C:
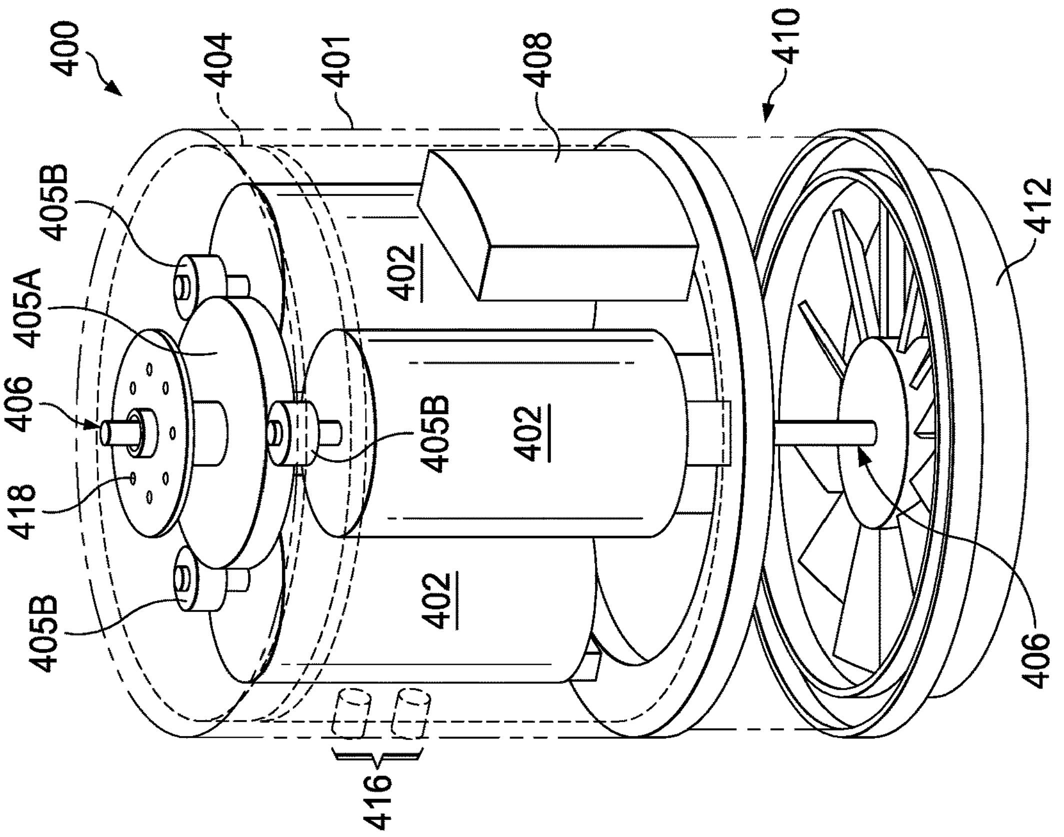
Figure 4B:
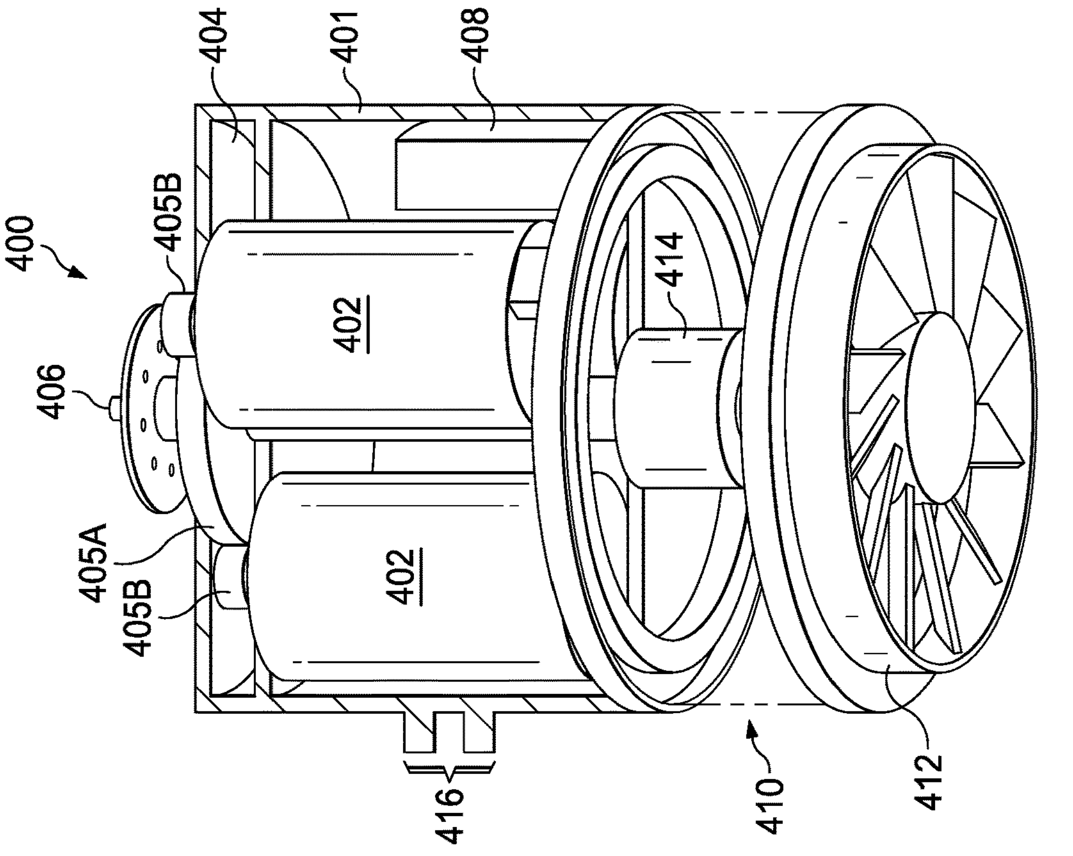

Referring now to FIGS. 4A-4C, in one embodiment, an integrated power unit 400 that may be used to implement the electric motor assembly 300, includes a housing 401 in which is disposed multiple electric motors, represented in FIGS. 4A-4C by three electric motors 402, that are combined via a gearbox 404, which in the illustrated embodiment is a spur 405A and planets 405B system. The motors 402 drive a rotor shaft 406 through the gearbox 404. Cooling of the motors 402 is handled by a liquid reservoir and pump assembly 408, a radial air-to-liquid heat exchanger 410, and an air cooling fan 412. The cooling fan 412 may be powered electrically (as shown in FIGS. 4A-4C, or mechanically via the rotor shaft 406. As illustrated in FIGS. 4A-4C, a collective pitch control rod and actuator 414 may optionally be integrated into the power unit 400.

In accordance with features of embodiments described herein, the power unit 400 is implemented as an LRU in which all supporting systems for unit (e.g., thermal cooling, fixed controls, and power transmission) are integrated into the assembly. The only interfaces necessary between the unit 400 and the aircraft into which it is installed are electrical connectors (illustrated in FIGS. 4A and 4B by connectors 416), structural attachments to the airframe, and rotor bolts 418. As previously noted, such integration allows for expedited aircraft maintenance and lower aircraft direct operating cost.

Figure 5:
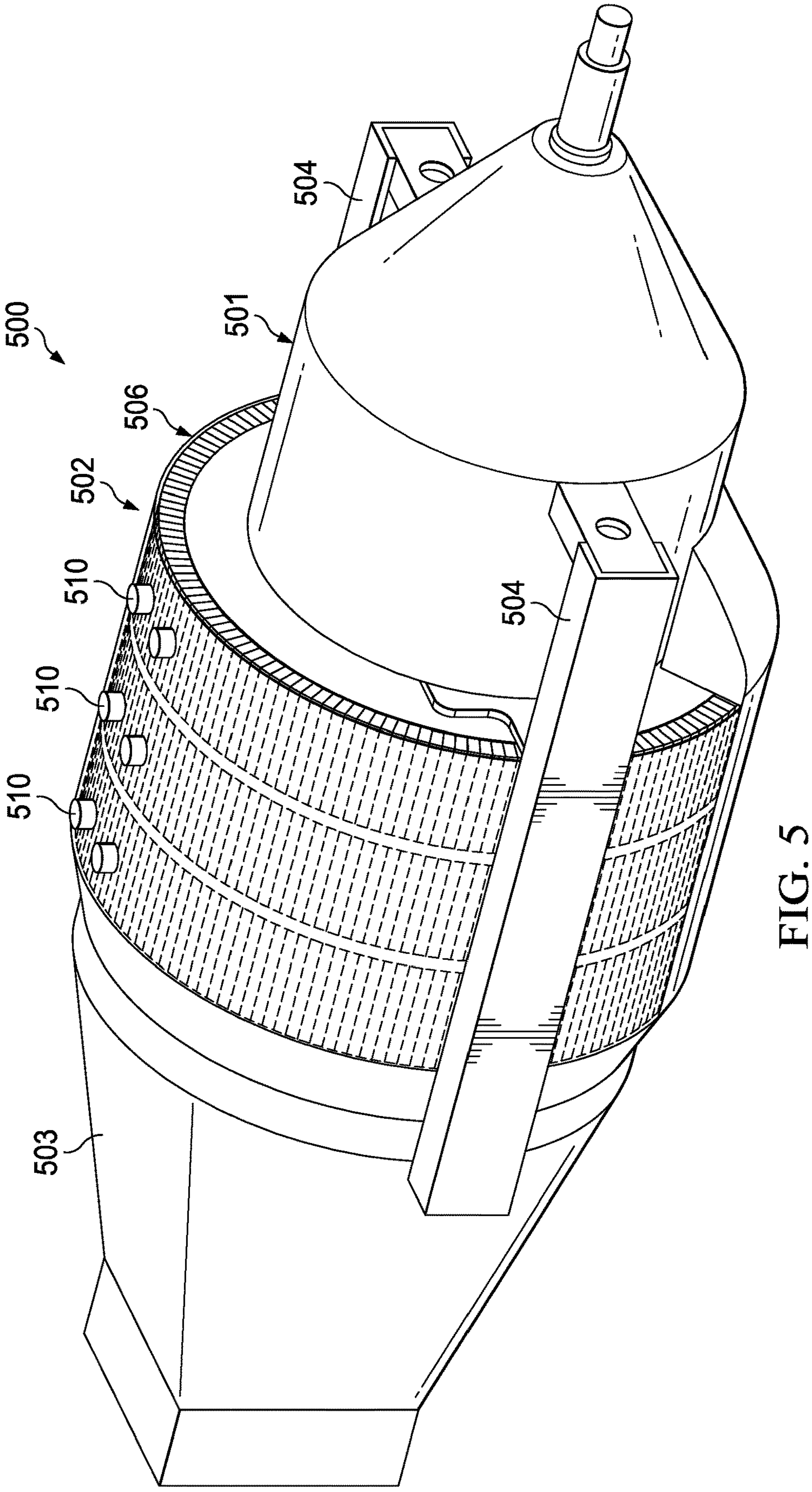
FIG. 5 illustrates an exterior of an example electric drive system line replaceable unit in accordance with alternative embodiments for implementation in aircraft having ducted rotors, such as that illustrated in FIGS. 1A-1B.

Referring now to FIG. 5, illustrated therein is an external view of an alternative embodiment of a power unit assembly 500 that may be used to implement the electric motor assembly 300. As shown in FIG. 5, the power unit assembly 500 comprises a gear box cover 501, an electrical unit 502, and a fan shroud 503. Side rails 504 disposed on opposite sides of the power unit assembly 500 to serve as structure and to hold the stack comprising gear box cover 501, electrical unit 502, and fan shroud 503 (i.e., the power unit), as well as a radial heat exchanger 506, together in lieu of a housing (such as housing 401). Heat exchanger 506 is provided to dissipate heat generated by electrical unit 502. Electrical connectors 510 are also provided for providing an electrical interface for transmitting power, data and/or control signals to and from the unit assembly 500.

Figure 6:
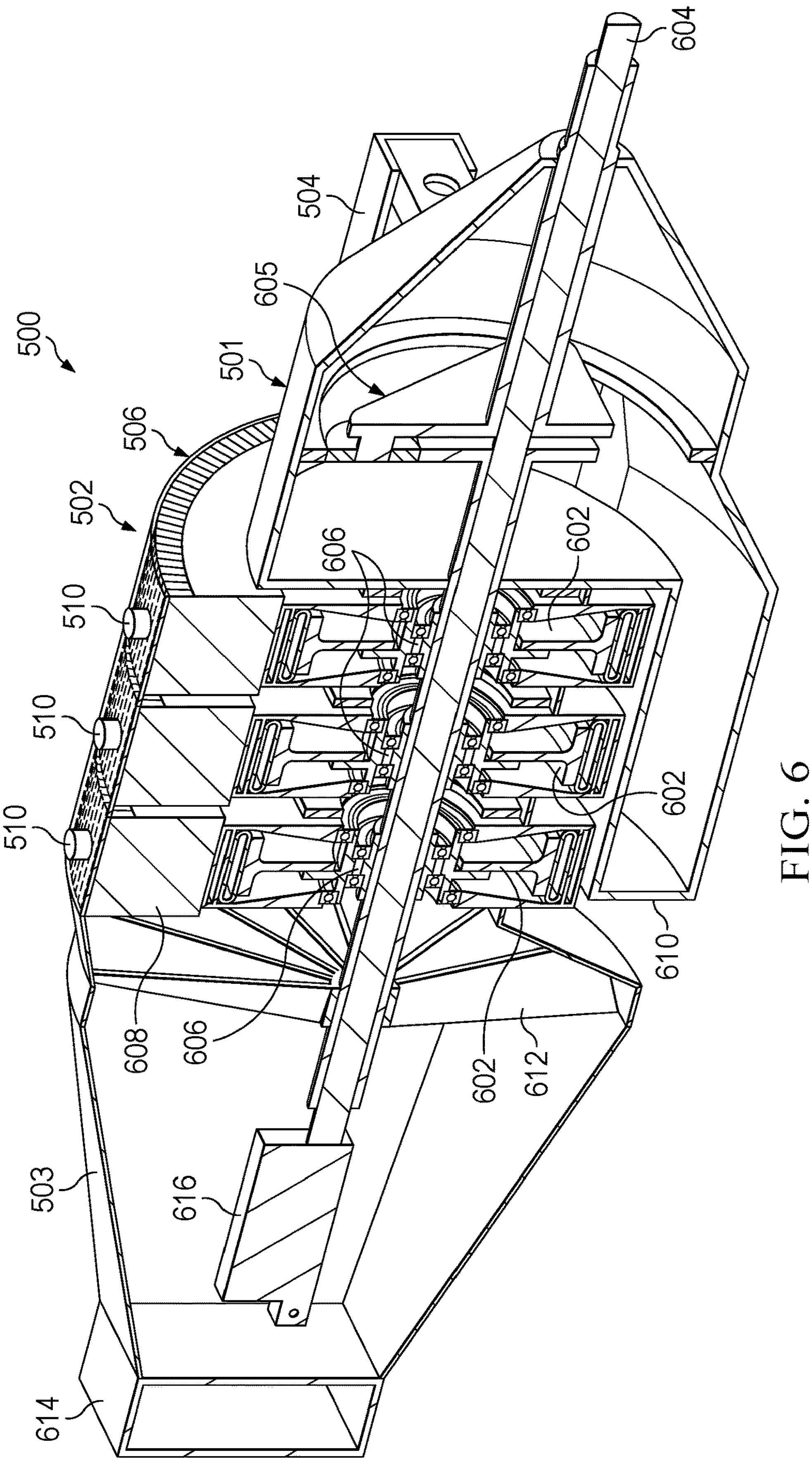
FIG. 6 illustrates a cutaway view of the example electric drive system line replaceable unit of FIG. 5.

FIG. 6 is a cutaway view of the power unit assembly 500 shown in FIG. 6. As shown in FIG. 6, similar to the power unit 400, the power unit assembly 500 includes three electric motors 602 (which form a portion of the electrical unit 502); however, unlike the power unit 400, in the power unit assembly 500, the motors drive a common shaft 604 via a planetary gear box 605. One way clutches 606 are provided for preventing failure of a single one of the motors 602 from causing the rotor shaft 604 to seize or affecting the speed of the remaining motors. The electrical unit 502 further includes power electronics 608 for converting direct current (DC) into alternating current (AC) and cooling of the motors 602 is provided by an oil sump 610, a mechanical air cooling fan 612, and an oil cooler 614. A collective pitch actuators and control rod assembly 616 may also be provided for controlling collective pitch of the rotor blades connected to the rotor shaft 604. The fan shroud 503 is provided for directing air from the fan 612 into the oil cooler 614. Heat exchanger 506 includes a set of fins mounted on the outside of the motors 602 and power electronics 608 to dissipate the heat generated by the power electronics. Air is pulled through the heat exchanger via the cooling fan 612.

Figure 7:
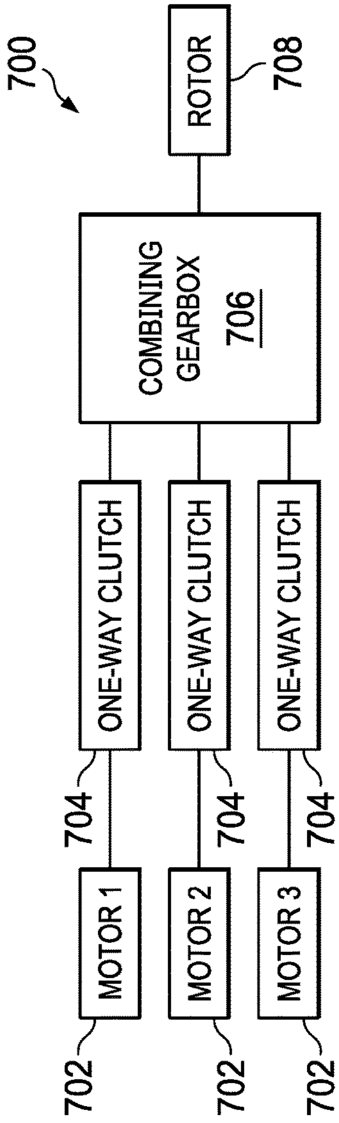
FIG. 7 is a block diagram illustrating a mechanical power path of an example electric drive system line replaceable unit in accordance with embodiments described herein.

FIG. 7 is a high level block diagram of a mechanical power path of a power unit 700, such as the power unit 400 or the power unit assembly 500. As shown in FIG. 7, the power unit 700 includes a plurality of electric motors, represented in FIG. 7 by three motors 702, each having associated therewith a one-way clutch 704. A gearbox 706 sums the torque of the individual motors 702 to generate rotational power to a rotor 708. As previously noted, the one-way clutches 704 allow stoppage of one of the motors 702 without affecting the speed of the other motors.

Figure 8:
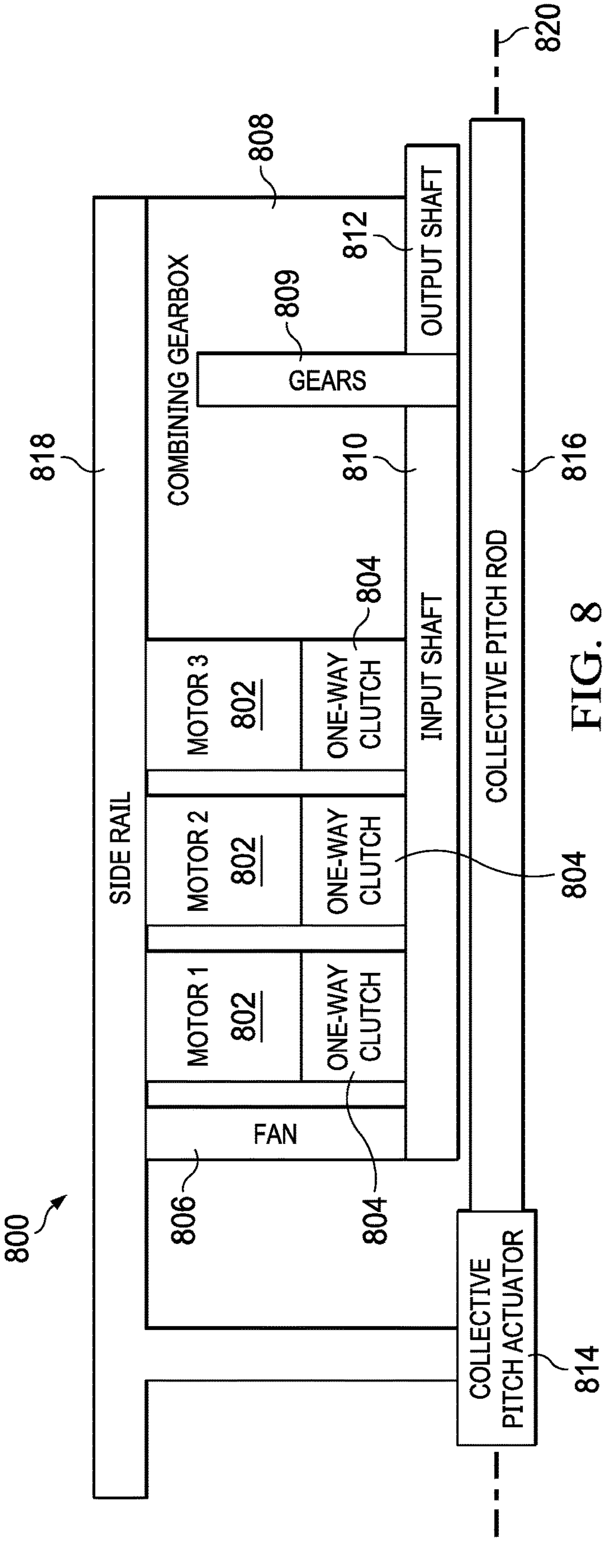
FIG. 8 is a block diagram illustrating mechanical attachments of various components of an example electric drive system line replaceable unit in accordance with embodiments described herein.

FIG. 8 is a high level block diagram illustrating mechanical attachment of a power unit 800, such as the power unit 400 or the power unit assembly 500. As shown in FIG. 8, the power unit 800 includes electric motors 802, one-way clutches 804, a fan 806, an input shaft 808, and a combining gearbox 810 that includes a gear 809 connected between the input shaft 808 and an output shaft 812. The power unit 800 further includes a collective pitch actuator 814, a collective pitch rod 816, and a side rail 818. A centerline 820 passes through the center of the collective pitch rod 816 and aligns with the center of a rotor hub (not shown) driven by the power unit 800. In accordance with features of embodiments described herein, each motor 802 is bolted to a respective one-way clutch 804. Each of the one-way clutches 804 are splined to the input shaft 808. Each of the motors 802 is bolted to the side rail 818. The combining gearbox 810 and the collective pitch actuator 814 are also bolted to the side rail 818.

Figure 9:
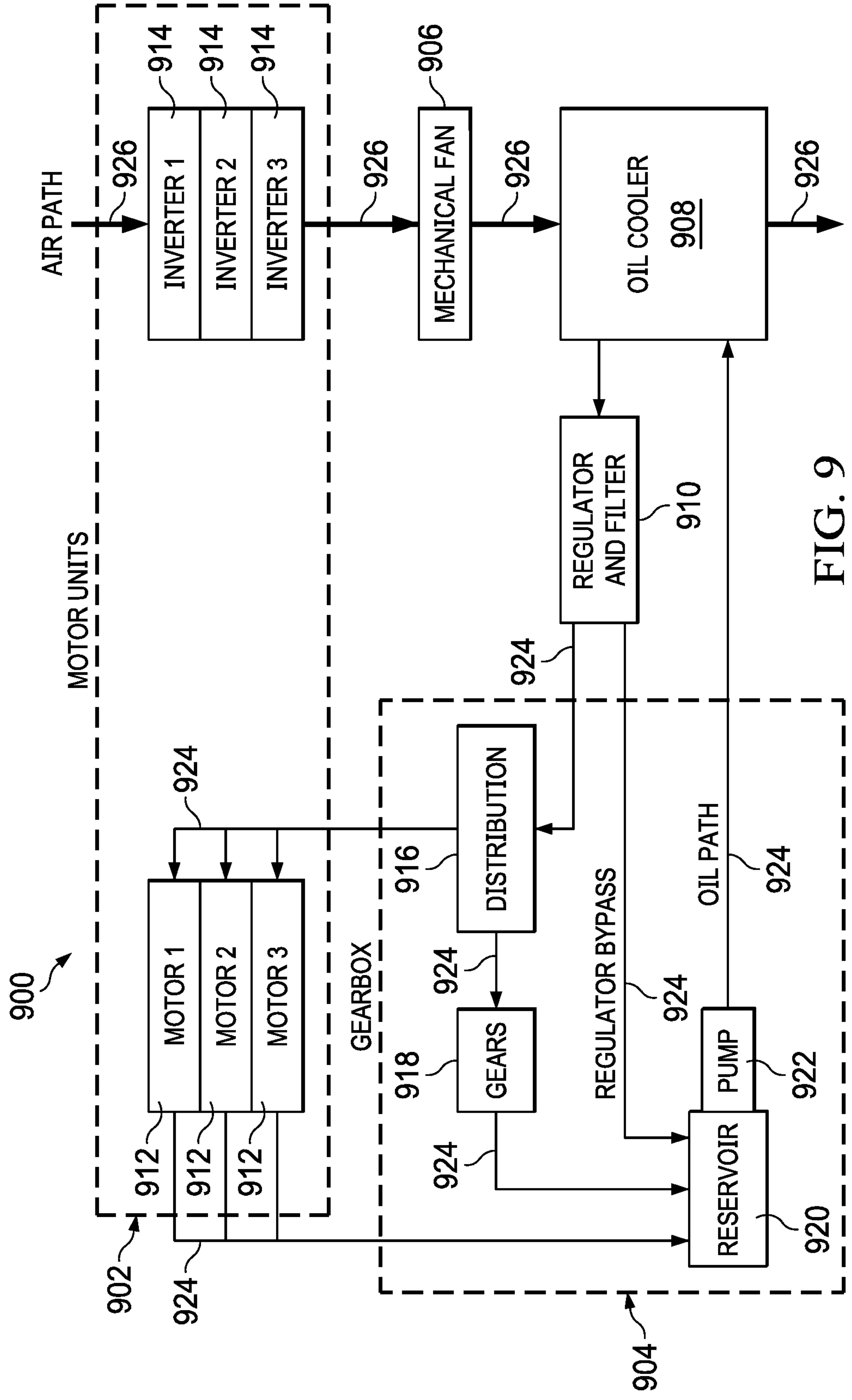
FIG. 9 is a block diagram illustrating a thermal cooling system of an example electric drive system line replaceable unit in accordance with embodiments described herein.

FIG. 9 is a schematic block diagram of a thermal cooling system of a power unit 900. As shown in FIG. 9, the power unit 900 includes an electric motor unit 902, a gearbox 904, a fan 906 (which is illustrated in FIG. 9 as a mechanical fan but which may also be implemented as an electrical fan in other embodiments), an oil cooler 908, and a regulator and filter 910. The motor unit 902 includes several electric motors 912 and corresponding inverters 914. The gearbox 904 includes a distribution module 916, gears 918, an oil reservoir 920, and an oil pump 922. An oil path through the unit 900 is illustrated by arrows 924. Beginning at the oil cooler 908, cooled oil is provided from the cooler to the regulator and filter 910, which filters and regulates the oil and from which a portion of it flows to the distribution module 916 and another portion of the cooled oil bypasses the regulator and flows to the reservoir 920. In certain embodiments, the latter path is used to bleed off excess pressure from the system. The distribution module 916 disperses oil to the motors 912 as well as the gears 918 to cool those elements. The oil used to cool the motors 912 and gears 918 then flows to the reservoir 920, from which it is pumped (via the pump 922) back to the oil cooler.

An air path through the power unit 900 is depicted by arrows 926. In particular, air is taken into the unit 900 via inverters 914 and is passed by the fam 906 to the oil cooler 908 to cool the oil therein for use in the oil path 924 (described above) and then out of the unit 900.

Figure 10:
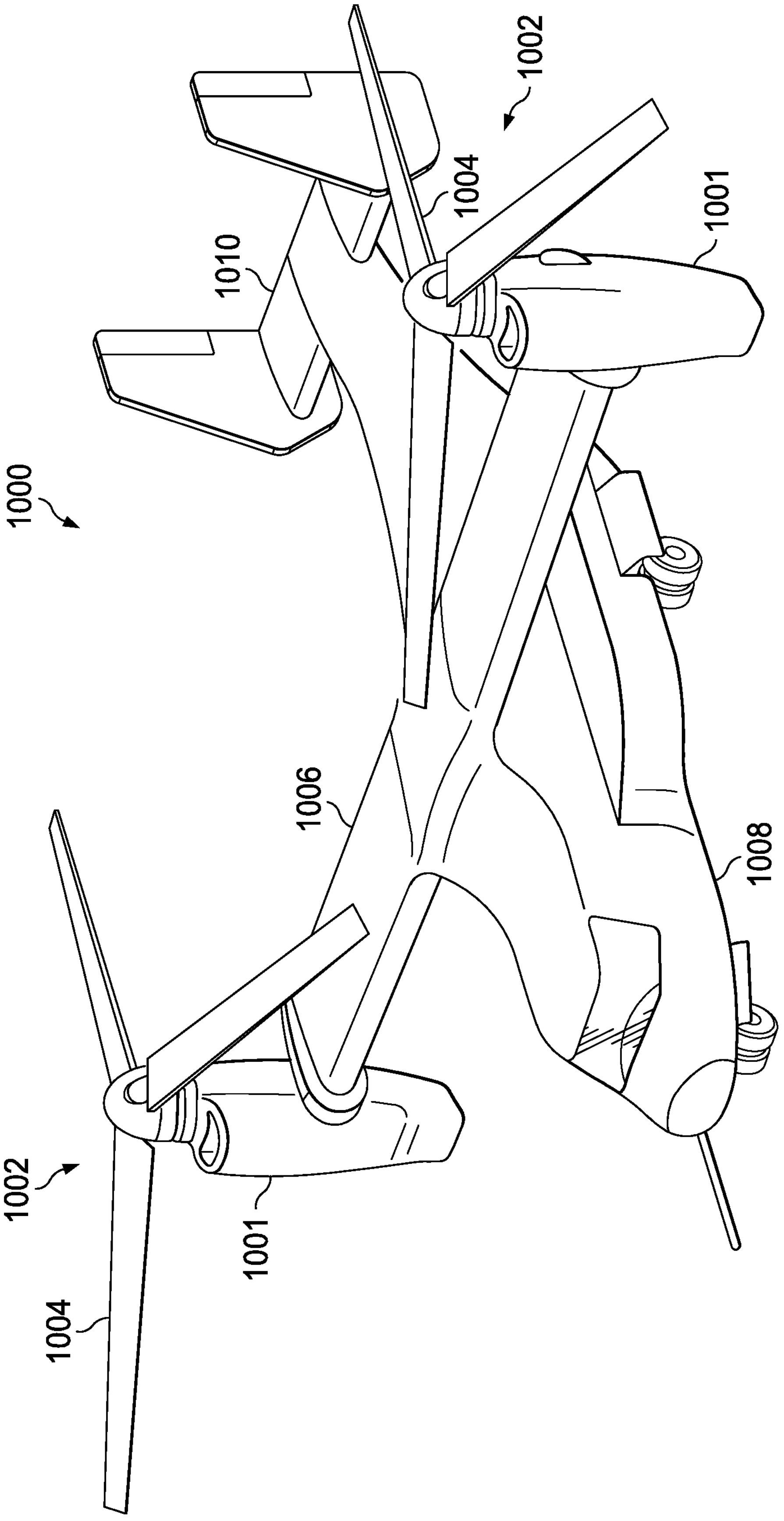
FIG. 10 illustrates a tilting unducted rotor aircraft including an electric drive system line replaceable unit in accordance with embodiments described herein.

FIG. 10 illustrates a tiltrotor aircraft 1000 having unducted rotors. In particular, aircraft 1000 includes nacelles 1001 each of which comprises a rotor system 1002 including a plurality of rotor blades 1004. The pitch of each rotor blade 1004 can be managed or adjusted in order to selectively control direction, thrust, and lift of aircraft 1000. Similar to the aircraft 100 (FIGS. 1A-1C), the aircraft 1000 is convertible between a helicopter mode (shown in FIG. 10), which allows for vertical takeoff and landing, hovering, and low speed directional movement, and an airplane mode (not illustrated), which allows for forward flight as well as horizontal takeoff and landing.

Aircraft 1000 further includes wings 1006, a fuselage 1008, and at last one tail member 1010. As previously noted, nacelles 1002 are each configured to rotate between a helicopter mode, in which the nacelles 1002 are approximately vertical, and an airplane mode, in which the nacelles 1002 are approximately horizontal.

Figure 11:
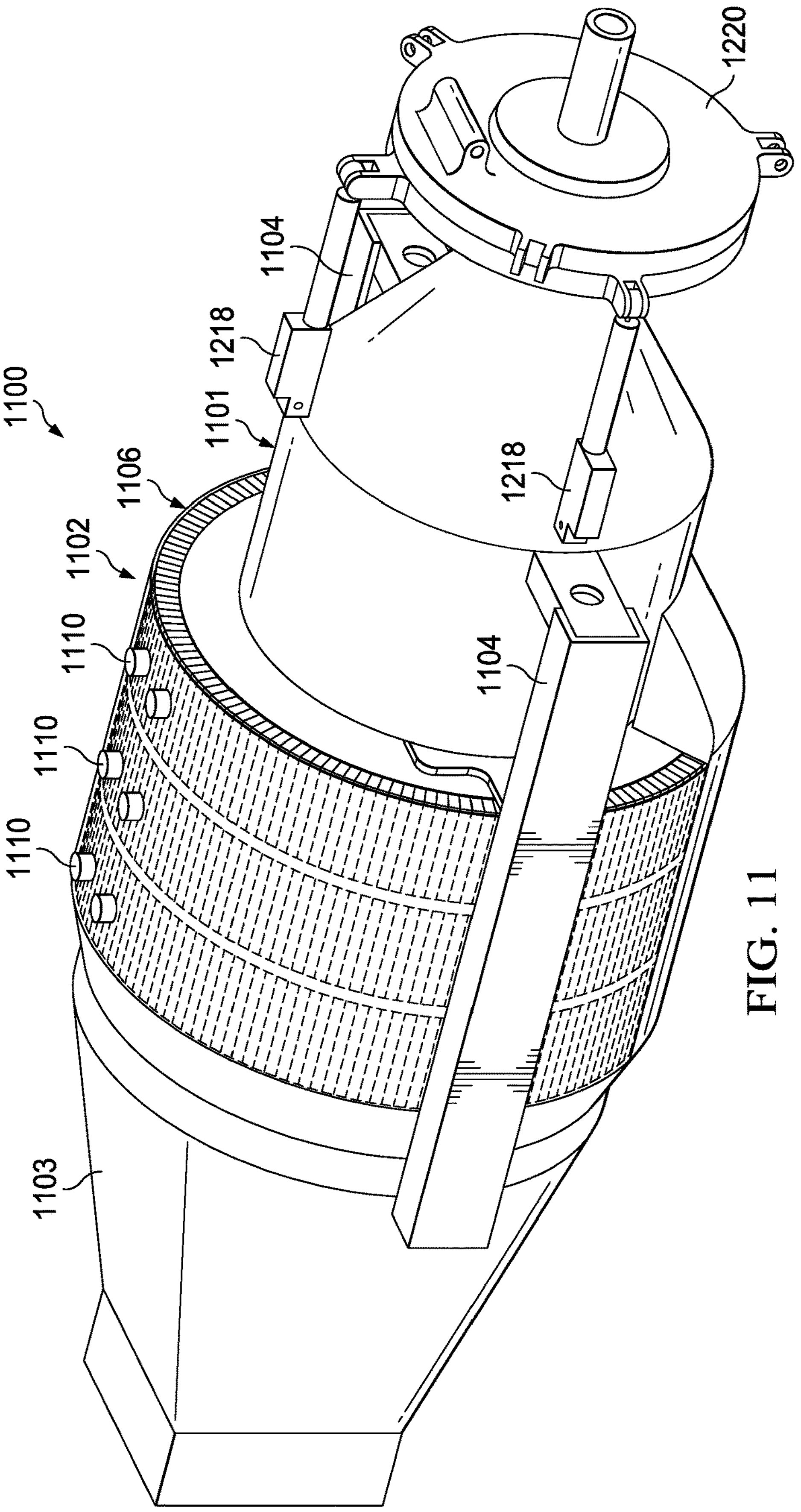
FIG. 11 illustrates an exterior of an example electric drive system line replaceable unit in accordance with other alternative embodiments for implementation in an aircraft having unducted rotors, such as that illustrated in FIG. 10.
Figure 12:
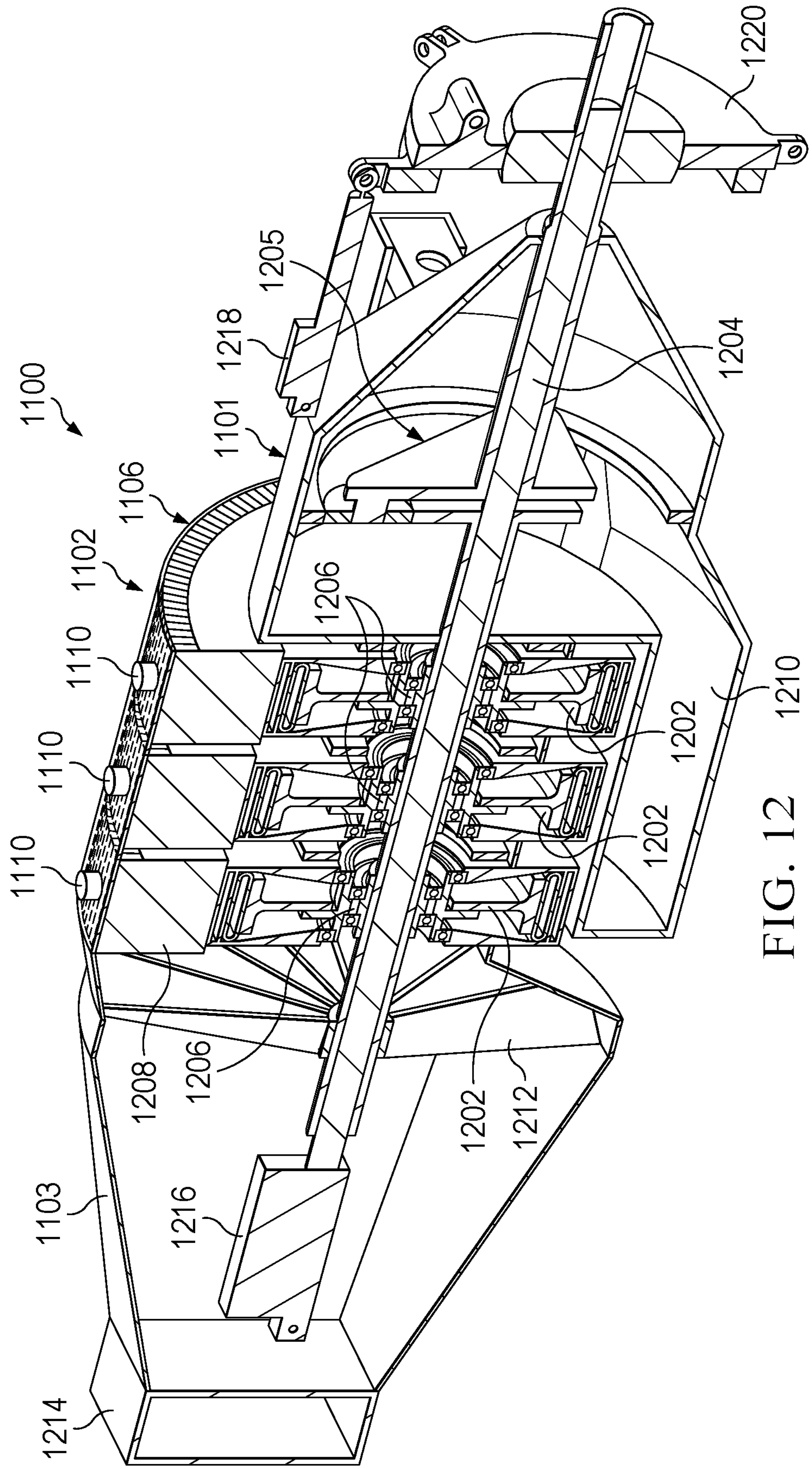
FIG. 12 illustrates a cutaway view of the example electric drive system line replaceable unit of FIG. 11.

Referring now to FIGS. 11 and 12 and with continued reference to FIG. 10, in accordance with features of embodiments described herein, each nacelle 1001 includes a power unit assembly 1100 for driving rotor systems 1002. As shown in FIG. 11, the power unit assembly 1100 comprises a gear box housing 1101, an electrical unit 1102, and a fan shroud 1103. Side rails 1104 disposed on opposite sides of the power unit assembly 1100 serve as structure and to hold the stack comprising gear box housing 1101, electrical unit 1102, and fan shroud 1103, as well as a radial heat exchanger 1106 (i.e., the power unit), together in lieu of a housing (such as housing 401). Heat exchanger 1106 is provided to dissipate heat generated by electrical unit 1102. Electrical connectors 1110 are also provided for providing an electrical interface for transmitting power, data and/or control signals to and from the assembly 1100.

FIG. 12 is a cutaway view of the power unit assembly 1100 shown in FIG. 11. As shown in FIG. 12, the electrical unit 1102 of the power unit assembly 1100 includes three electric motors (i.e., motors 1202) that drive a common shaft 1204 via a planetary gear box 1205. One way clutches 1206 are provided for preventing failure of a single one of the motors 1202 from causing the rotor shaft 1204 to seize or affecting the speed of the remaining motors. The electrical unit 1102 further includes power electronics 1208 for converting direct current (DC) into alternating current (AC) and cooling of the motors 1202 is provided by an oil sump 1210, a mechanical air cooling fan 1212, and an oil cooler 1214. A collective pitch actuators and control rod assembly 1216 may also be provided for controlling collective pitch of the rotor blades connected to the rotor shaft 1204. Additionally, cyclic pitch actuators 1218 are provided and connected to a swashplate 1220 for providing cyclic control of the rotor blades. In particular, cyclic pitch actuators 1218 enable control of the mechanical pitch, or featuring, angle of each rotor blade independently depending on the position of the rotor blade in the cycle. Fan shroud 1103 is provided for directing air from the fan 1212 into the oil cooler 1214. Heat exchanger 1106 includes a set of fins mounted on the outside of the motors 1202 and power electronics 1208 to dissipate the heat generated by the power electronics. Air is pulled through the heat exchanger via the cooling fan 1212.

Example 1 is an electric drive system including a plurality of redundant motors, wherein power generated by the plurality of motors is used to drive a rotor system comprising a rotor shaft having a plurality of rotor blades connected thereto; a gear box associated with the plurality of redundant motors; a collective actuator for controlling a collective pitch of the rotor blades connected to the rotor shaft; and at least one structural element for retaining the redundant motors, the gear box, and the collective actuator together as a single integrated unit.

In Example 2, the electric drive system of Example 1 may further include a cooling fan for drawing air into the line replaceable unit across an electronic component of the line replaceable unit to cool the electronic component and for expelling air into an oil cooler for cooling oil contained therein.

In Example 3, the electric drive system of any of Examples 1-2 may further include the cooling fan being mechanically powered by the rotor shaft.

In Example 4, the electric drive system of any of Examples 1-3 may further include the cooling fan being electrically powered.

In Example 5, the electric drive system of any of Examples 1-4 may further include an oil distribution system for distributing oil cooled by the oil cooler to at least one motor and at least one gearbox, wherein the distributed oil is used to cool the at least one motor and the at least one gearbox.

In Example 6, the electric drive system of any of Examples 1-5 may further include a reservoir for collecting the distributed oil after it has been used to cool the at least one motor and the at least one gearbox.

In Example 7, the electric drive system of any of Examples 1-6 may further include a pump associated with the reservoir for returning the oil collected in the reservoir to the oil cooler.

In Example 8, the electric drive system of any of Examples 1-7 may further include the least one structural element comprising a housing having electrical connectors therethrough.

In Example 9, the electric drive system of any of Examples 1-8 may further include the at least one structural element comprising first and second rails disposed on opposite sides of the unit.

In Example 10, the electric drive system of any of Examples 1-9 may further include each of the motors comprising an electric motor.

In Example 11, the electric drive system of any of Examples 1-10 may further include the rotor shaft being disposed through a center of the integrated unit.

In Example 12, the electric drive system of any of Examples 1-11 may further include each of the motors having associated therewith a one-way clutch.

Example 13 is a rotor system comprising a ducted rotor comprising a plurality of rotor blades connected to a rotor shaft; a nacelle for supporting the ducted rotor; and an electric drive system comprising: a plurality of redundant motors; a gear box associated with the plurality of redundant motors; a collective actuator for controlling a collective pitch of the rotor blades connected to the rotor shaft; and at least one structural element for retaining the redundant motors, the gear box, and the collective actuator together as a single integrated unit, wherein power generated by the plurality of motors is used to drive the rotor shaft and wherein the electric drive system is implemented as a line replaceable unit disposed in the nacelle.

In Example 14, the rotor system of Example 13 may further include the at least one structural element comprising at least one of a housing and first and second rails disposed on opposite sides of the unit.

In Example 15, the rotor system of any of Examples 13-14 may further include each of the motors comprising an electric motor having associated therewith a one-way clutch.

In Example 16, the rotor system of any of Examples 13-15 may further include the rotor shaft being disposed through a center of the line replaceable unit.

Example 17 is a rotorcraft comprising a rotor system comprising a ducted rotor comprising a plurality of rotor blades connected to a rotor shaft; a nacelle for supporting the ducted rotor; and an electric drive system comprising a plurality of redundant motors; a gear box associated with the plurality of redundant motors; a collective actuator for controlling a collective pitch of the rotor blades connected to the rotor shaft; and at least one structural element for retaining the redundant motors, the gear box, and the collective actuator together as a single integrated unit, wherein power generated by the plurality of motors is used to drive the rotor shaft and wherein the electric drive system is implemented as a line replaceable unit disposed in the nacelle.

In Example 18, the rotorcraft of Example 17 may further include the at least one structural element comprising at least one of a housing and first and second rails disposed on opposite sides of the unit.

In Example 19, the rotorcraft of any of Examples 17-18 may further include each of the motors comprising an electric motor having associated therewith a one-way clutch.

In Example 20, the rotor system of any of Examples 17-19 may further include the rotor shaft is disposed through a center of the line replaceable unit.

It should be appreciated that aircraft illustrated herein, such as ducted rotor aircraft 100 and unducted rotor aircraft 1000, are merely illustrative of a variety of aircraft that can implement the embodiments disclosed herein. Indeed, the various embodiments of the electric drive system line replaceable unit described herein may be used on any aircraft that utilizes motors. Other aircraft implementations can include hybrid aircraft, tiltrotor aircraft, quad tiltrotor aircraft, unmanned aircraft, gyrocopters, airplanes, helicopters, commuter aircraft, electric aircraft, hybrid-electric aircraft, ducted fan aircraft having any number of ducted fans, tiltwing aircraft, including tiltwing aircraft having one or more interwing linkages, more or fewer ducted fans or non-ducted rotors and the like. As such, those skilled in the art will recognize that the embodiments described herein for an electric drive system line replaceable unit can be integrated into a variety of aircraft configurations. It should be appreciated that even though aircraft are particularly well-suited to implement the embodiments of the present disclosure, non-aircraft vehicles and devices can also implement the embodiments.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, RI, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. An electric drive system comprising:
- a plurality of redundant motors arranged in a stack relative to one another, wherein power generated by the plurality of motors is used to drive a rotor system comprising a rotor shaft having a plurality of rotor blades connected thereto;
- a gear box associated with the plurality of redundant motors;
- a collective actuator for controlling a collective pitch of the rotor blades connected to the rotor shaft; and
- at least one structural element for retaining the stack of redundant motors, the gear box, and the collective actuator together as a single integrated unit.

2. The electric drive system of claim 1 further comprising a cooling fan for drawing air across an electronic component to cool the electronic component and for expelling air into an oil cooler for cooling oil contained therein.

3. The electric drive system of claim 2, wherein the cooling fan is mechanically powered by the rotor shaft.

4. The electric drive system of claim 2, wherein the cooling fan is electrically powered.

5. The electric drive system of claim 1 further comprising an oil distribution system for distributing oil cooled by the oil cooler to at least one motor and at least one gearbox, wherein the distributed oil is used to cool the at least one motor and the at least one gearbox.

6. The electric drive system of claim 5 further comprising a reservoir for collecting the distributed oil after it has been used to cool the at least one motor and the at least one gearbox.

7. The electric drive system of claim 6 further comprising a pump associated with the reservoir for returning the oil collected in the reservoir to the oil cooler.

8. The electric drive system unit of claim 1 wherein the least one structural element comprises a housing having electrical connectors therethrough.

9. The electric drive system of claim 1, wherein the at least one structural element comprises a first rail on a first side of the unit and a second on a second side of the unit opposite the first side of the unit.

10. The electric drive system of claim 1, wherein each of the motors comprises an electric motor.

11. The electric drive system of claim 1, wherein the rotor shaft is disposed through a center of the integrated unit.

12. The electric drive system of claim 1, wherein each of the motors has associated therewith a one-way clutch.

13. A rotor system comprising:
- a ducted rotor comprising a plurality of rotor blades connected to a rotor shaft;
- a hub for supporting the ducted rotor; and
- an electric drive system comprising:
  - a plurality of redundant motors configured in a stacked arrangement;
  - a gear box associated with the plurality of redundant motors;
  - a collective actuator for controlling a collective pitch of the rotor blades connected to the rotor shaft; and
  - at least one structural element for retaining the stacked arrangement of the redundant motors, the gear box, and the collective actuator together as a single integrated unit;
- wherein power generated by the plurality of motors is used to drive the rotor shaft; and
- wherein the electric drive system is implemented as a line replaceable unit disposed in the hub.

14. The rotor system of claim 13, wherein the at least one structural element comprises at least one of a housing and first and second rails disposed on opposite sides of the unit.

15. The rotor system of claim 13, wherein each of the motors comprises an electric motor having associated therewith a one-way clutch.

16. The rotor system of claim 13, wherein the rotor shaft is disposed through a center of the line replaceable unit.

17. A rotorcraft comprising:
- a rotor system comprising a ducted rotor comprising a plurality of rotor blades connected to a rotor shaft;
- a hub for supporting the ducted rotor; and an electric drive system comprising:

a motor stack comprising a plurality of redundant motors;

a gear box associated with the motor stack;

a collective actuator for controlling a collective pitch of the rotor blades connected to the rotor shaft; and at least one structural element for retaining the motor stack, the gear box, and the collective actuator together as a single integrated unit;

wherein power generated by the motor stack is used to drive the rotor shaft; and wherein the electric drive system is implemented as a line replaceable unit disposed in the hub.

18. The rotorcraft of claim 17, wherein the at least one structural element comprises at least one of a housing and first and second rails disposed on opposite sides of the unit.

19. The rotorcraft of claim 17, wherein each of the motors comprises an electric motor having associated therewith a one-way clutch.

20. The rotor system of claim 17, wherein the rotor shaft is disposed through a center of the motor stack.

* * * * *